June 14, 1927.
O. G. CRANNELL
COUPLING MEANS FOR CHAINS
Filed Jan. 15, 1927
1,632,697
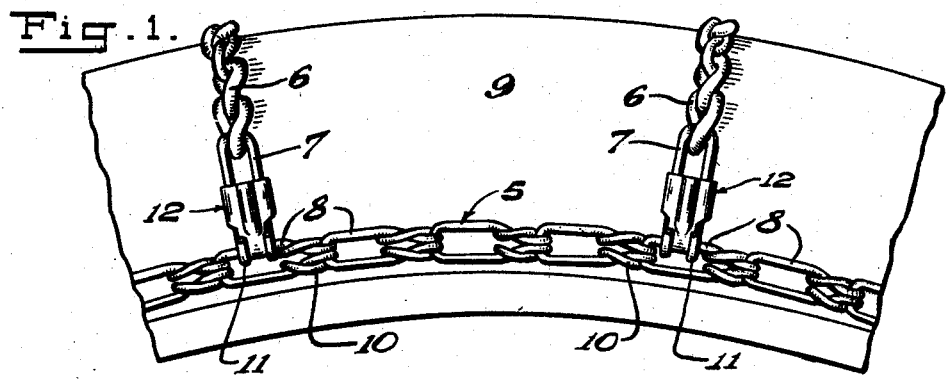
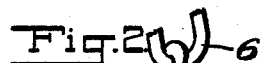
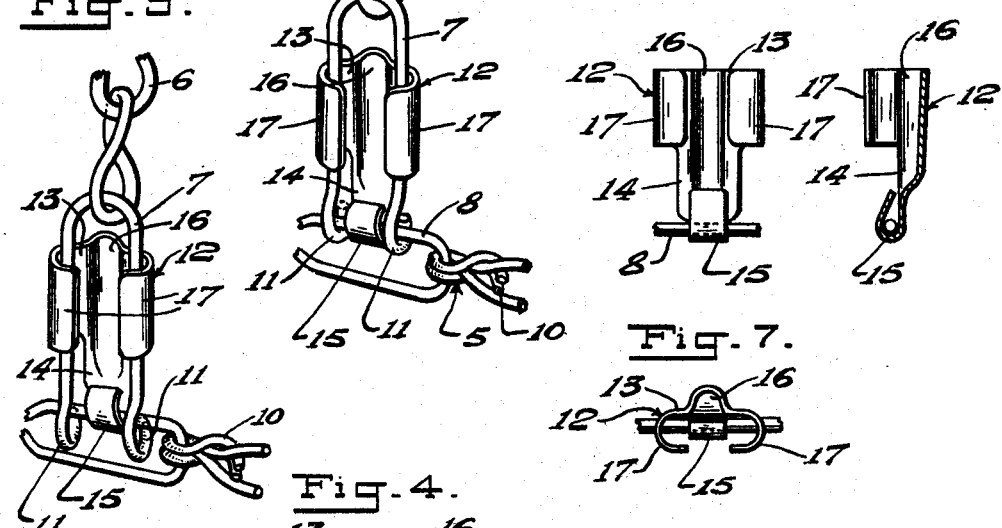
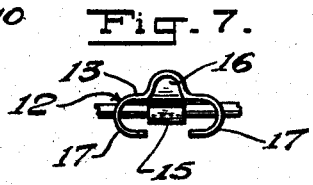
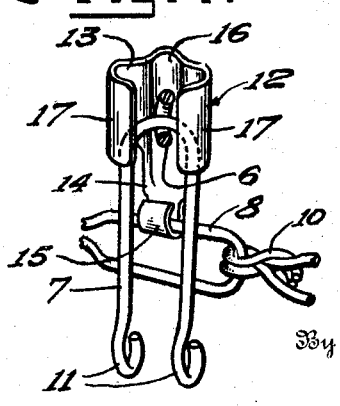
Inventor
Orlo G. Crannell
By
Attorney Patented June 14, 1927.

1,632,697

UNITED STATES PATENT OFFICE.

ORLO G. CRANNELL, OF LYNN, MASSACHUSETTS.

COUPLING MEANS FOR CHAINS.

Application filed January 15, 1927. Serial No. 161,422.

This invention relates to improvements in chain coupling means for positively attaching chain links of various types, and particularly intended for connecting the cross-chains with the longitudinal chains of an anti-skid chain device.

The principal object of the invention is to provide a secure yet readily separable coupling means or connection between a cross chain and a longitudinal chain.

A further object of the invention is to include in a coupling means or connection for the parts or members of a chain organization, a keeper that remains movably intact with one part or member of the chain organization and through which a chain link connecting member is movable and connectible to or separable therefrom to easily and readily connect or disconnect one part or member of the chain organization relatively to the remaining part or member thereof without separation of the keeper, when substitution or repair is necessary.

A still further object of the invention is to provide means, particularly in connection with an anti-skid chain, for detaching and attaching the longitudinal chain and any of the usual cross-chains without requiring the least modification of the links of the said chains, or the hook-links usually employed for connecting the two sets of chains, and to avoid the use of fastening devices, or tools or implements for securing and opening or closing the parts of the improved means or the chain links for effecting a detachment of a cross-chain, or, to secure assemblage of the cross-chain with the longitudinal chain.

The invention consists generally in a coupling involving substantially the usual form of hook-link for connecting a cross-chain and longitudinal chain, and a keeper that remains intact with the links of the longitudinal chain, the hook-link being slidable through the keeper with a part of one of the cross-chains to effect release or attachment of the two sets of chains.

The invention further consists in the more specific construction and arrangement of the several parts of invention which will be more fully hereinafter described and claimed.

In the drawing:—

Figure 1 is a fragmentary side elevation of wheel rim and tire, with a portion of an anti-skid chain with the features of the invention embodied therein.

Figure 2 is an enlarged rear perspective view showing the improved coupling means with the parts in secured positions and applied to a part of one of cross-chains and a longitudinal chain of an anti-skid chain.

Figure 3 is a view similar to Figure 1, with the parts of the coupling partially separated.

Figure 4 is a view similar to Figures 2 and 3 with the parts of the improved coupling separated to a further extent, and in position for complete disconnection of the cross-chain.

Figures 5, 6 and 7 are respectively a rear elevation, a transverse vertical section and a top plan view of the keeper shown applied to a portion of one of the links of the longitudinal chain.

Figure 8 is a detail side elevation of the coupling hook-link.

In the accompanying drawings, the invention is illustrated in its preferred application to an anti-skid tire chain to provide a readily separable coupling or attaching means between the longitudinal and cross-chains, and whereby the cross-chains may be readily separated and replaced and the said cross-chains when connected to longitudinal chains will remain in secure attachment without liability of accidental disengagement.

The numeral 5 generally designates a longitudinal chain, 6 the cross-chain and 7 the coupling link which is interposed between the several cross-chains and longitudinal chains. Each longitudinal chain is made up of a series of links 8 which usually lie flat against the side of a tire 9, and have connecting links 10, and the cross-chains 6 comprise a series of links which are usually of harder metal than the longitudinal chains 5, and may vary in length in accordance with the dimensions of the tire to which they are applied. The coupling link 7 is of the usual form with spaced hooks 11 at one end which are caught in the links 8 of the longitudinal chains, the said coupling link 7 being of substantially the same formation as that ordinarily employed with the exception that it is a little shorter than the commonly used coupling link. The longitudinal and cross-chains and the links 7 are not structurally modified to apply the features of the invention thereto, except in the particular noted in regard to the link 7.

The essential feature of the invention consists of a keeper 12, which is formed from a blank of metal of suitable thickness and having a body 13 with a fastening member 14 extending therefrom and of less width than the said body and terminating in an attaching loop 15 which is materially less in width than the member 14 and loosely engages the upper bar of each link 8, which is also engaged by the hook link 7, the attaching loop 9 being bent around rearwardly and outwardly towards the front of the keeper, or more specifically towards a portion of the member 14, as clearly shown by Figures 5 and 6. The opening between the free extremity of the attaching loop 15 and the member 14 of the keeper is materially less than the diameter of the bar of the link 8 to which said attaching loop is applied and is free to move within the attaching loop, so as to eliminate all obstruction to the necessary relaxation or loose assemblage of the cross-chains 6 relatively to the longitudinal chains 5. The keeper 12 has a central longitudinal extending corrugation 16 which extends through the body 13 and continues partially over the length of the member 14, and the body 13 has inwardly and rearwardly bent guides 17 at opposite sides thereof, said guides being in the form of open loops having their free edges terminating short of the side portions of the corrugation 16. When each hook link 7 is applied to one of the links 8, the hook terminals 11 thereof are caught around the upper bars of the links 8, being applied to the latter from the rear in an outward direction, and the loop 15 is located between the said hook terminals 11. The lateral space between the said hook terminals 11 is materially greater than the width of the loop 15, as very clearly shown by Figure 2 to provide for ample loose movement of said loop. The open side of the keeper 12 when applied to the hook link is adjacent to the tire 9, and between the terminal link of the cross-chain 6, and the upper terminal of the keeper, when applied to the hook link, is of considerable distance from the said upper terminal of the keeper, in order to avoid interference with the free movement of the cross-chain relatively to and in the hook link during the compressing and expanding action of the tire during travel. The keeper is free to slide on the side bars of the hook link 7, and the terminal link of the cross-chain 6 thereof is free to move in the central corrugation 6, as shown by Figure 4. When the keeper is in its retaining association with the link 7 and when the latter has its hook terminals 11 in engagement with the upper bar of the link 8 it will be impossible for the said hook link to become accidentally disengaged or separated, and by this means, under normal conditions, the cross-chain and longitudinal chain will remain securely connected. There are no fastening devices between the keeper 12 and the hook line 7, and by this means further restriction of the freedom of action of the hook link relatively to the keeper and the remaining parts of the anti-skid chains will be maintained, yet at all times when the keeper and hook link are associated with the two chains 5 and 6 as the coupling means therefor, the retention of the said parts in their coupling association will be such as to resist any self separation of the hook link relatively to either the cross-chain or the longitudinal chain until manually operated to effect a release for the purpose of replacement or substitution of one cross-chain for another for the purpose of repair.

When it is desired or necessary to separate or detach any one of the cross-chains 6 from the longitudinal chain 8, the hook link 7 is pushed downwardly through the guides 17 of the keeper 12 from the position shown by Figure 2 to that illustrated by Figure 3 far enough to cause the hook terminals 11 to become disengaged from the upper bar of the link 8 with which it has been associated. This downward movement of the hook link 7 is permitted in view of the slackness or play of the cross-chains relatively to the longitudinal chains, and the parts are so proportioned that the hook link 7 which is moved downwardly will be so operated without resistance. When the hook terminals 11 are far enough disengaged from the upper bar of the link 8, the adjacent terminal link of the cross-chain is moved into the corrugation 16 a sufficient distance to permit the hook link to more fully clear the keeper, as shown by Figure 4, and in such position the terminal link of the cross-chain 6 will be in intermediate position, it being understood that the parts may be so positioned relatively to one another that the separation will be encouraged and no obstruction will ensue. Finally when the hook link 7 is entirely separated from the keeper it may then be disconnected from the cross-chain link, the opening at the back or rear side of the keeper permitting the cross-chain to assume a proper position for clearance movement of the hook link from the keeper and subsequently the keeper may be detached from the said link of the cross chain. In assembling the parts a reverse operation of the hook link and the cross-chain is pursued relatively to the keeper after the hook link has been associated with a substitute or new cross-chain, and finally the hook link 7 will be threaded through the keeper with the hook terminals 11 in engagement with the upper bar of the link 8 of the longitudinal chain and the repair thus quickly made. It will be seen that in view of the proportions of the several parts and whereby movement of the link 7 with relation to the keeper 12 may be easily effected, the resistance that might ordinarily be considered as a preventive to the ready operation or separation and reattachment of the hook link relatively to the keeper will be avoided and no material obstruction will ensue to the simple operation of detaching and reattaching the hook link, as just explained. Further, if the link 7 and keeper 12 become clogged with snow or other material, the normal open or loose association of said parts will also result in overcoming obstruction to operation thereof from such cause.

The improved device is especially advantageous in view of the simplicity of the several parts and the absence of fastening devices engaging the hook link and the keeper 12 and unnecessary resort to the use of tools or implements to disengage or separate the several parts or to reassemble said parts after the repair has been made.

As heretofore indicated the keepers 12 remain intact with the upper bars of the links 8 of the longitudinal chains 5 and are always in position for operation, and will not become misplaced or lost, and furthermore, a spring or clasping action, which might be irregularly disturbed or modified during the use of the anti-skid chain, is avoided. The detachment and re-assemblage of the parts of the coupling have been explained in the event of breakage or wear of a cross-chain, but it is to be understood that in the event of an impairment of one of the hook links 7 instead of the cross-chain with which it has been associated, may be readily rectified by pursuing the same operation, and in which latter event a new hook link may be easily provided and replace that which has become unfit for further use.

As hereinbefore indicated, the improved coupling device is adapted particularly for use with an anti-skid chain, but is equally well adapted for use with links of chains for other purposes, and it is intended to apply the improved coupling means wherever it may be found applicable and will practically perform its function.

What is claimed as new is:—

1. A chain coupling means comprising in combination with separable chains, a hook link separably engaging a link of one chain, and having the other chain also connected thereto, and a keeper having a terminal portion connected to one chain and through which the hook link with a portion of the chain connected thereto is freely slidable to disconnect the hook link and the two chains.

2. A chain coupling means for two chains, consisting of a hook link separably engaging portions of both chains, and a keeper having one end formed with a fastening member terminating in a hook secured to a portion of one of the chains and freely slidable on the hook link and operable to permit the said hook link and a portion of one of the chains to move therethrough to disconnect the hook link and both chains.

3. A chain coupling means for two chains, consisting of a hook link separably engaging portions of both chains, and a keeper fully open at one side and having one end secured to a portion of one of the chains and also having an open back with open guide means at the opposite sides, the hook link being freely slidable through the keeper to permit the link to be released from one of the chains and to disconnect both chains and the link.

4. A chain coupling means for two chains consisting of a hook link separably engaging portions of both chains, and a keeper having a terminal hook secured to and retained in connection with one chain and also formed with an open back having open spaced side guides and a central outwardly projected longitudinal guide corrugation, a portion of one of the chains and the hook link being freely slidable through the keeper to release the chains and said link.

5. A chain coupling means for chains, consisting of a link having one end formed with spaced hooks whereby the said link is held in separable engagement with portions of both chains, and a keeper having one end secured to and retained in connection with one chain, the link and a portion of one of the chains being slidable through the keeper to release both chains and link.

6. A coupling means for chains consisting of a link separably associated at opposite extremities with the chains, and a keeper retained in movable connection with one chain and having an opening at one side through which the link and a portion of one of the chains is freely slidable to connect and disconnect both chains and the link.

7. A coupling means for chains consisting of a connecting link separably associated with the chains, and a keeper plate movably connected at one extremity to one of the chains and through which the link and a portion of the remaining chain is freely movable to connect and disconnect both chains and the link.

In testimony whereof I have hereunto set my hand.

ORLO G. CRANNELL.